United States Patent
Chu

(10) Patent No.: US 7,178,302 B2
(45) Date of Patent: Feb. 20, 2007

(54) MULTI-LAYER VACUUM ASSEMBLY-ENABLED FUNDAMENTAL BUILDING MATERIAL

(75) Inventor: Arthur Chu, Richmond Hill (CA)

(73) Assignee: Han Star Co., Ltd., Richmond Hill (CA)

( * ) Notice: Subject to any disclaimer, the term of this patent is extended or adjusted under 35 U.S.C. 154(b) by 434 days.

(21) Appl. No.: 10/749,403

(22) Filed: Jan. 2, 2004

(65) Prior Publication Data

US 2005/0166477 A1 Aug. 4, 2005

(51) Int. Cl.
*E04C 3/00* (2006.01)
(52) U.S. Cl. ........................................ 52/578
(58) Field of Classification Search ............... 52/1, 52/578, 589.1, 795.1, 788.1, 592.1, 284
See application file for complete search history.

(56) References Cited

U.S. PATENT DOCUMENTS 4,944,127 A * 7/1990 Clear ...................... 52/309.12
5,175,975 A * 1/1993 Benson et al. ............. 52/788.1
5,500,305 A * 3/1996 Bridges et al. ............. 428/621
5,617,686 A * 4/1997 Gallagher, Jr. ........... 52/309.12
5,664,396 A * 9/1997 Lyman et al. .............. 52/788.1

FOREIGN PATENT DOCUMENTS

| TW | 113707 | 5/1989 |
| TW | 282799 | 8/1996 |

* cited by examiner

*Primary Examiner*—Naoko Slack
*Assistant Examiner*—Jessica Laux
(74) *Attorney, Agent, or Firm*—Birch, Stewart, Kolasch & Birch, LLP

(57) ABSTRACT

A multi-layer vacuum assembly-enabled fundamental building material to strengthen the safety of a building structure includes a main body which has a plurality of vacuumized layers formed from the exterior towards the interior that are divided by a plurality of spacers. The shape of the main body may be designed according to requirements of the building structure. The main body further has a first latch section and a second latch section located on the outer side thereof. The vacuumized layers can cushion damage resulting from impact of external forces. It also can block thermal conduction, thereby achieve shock resistant, fire resistant, heat and cold isolation effects.

6 Claims, 6 Drawing Sheets

MULTI-LAYER VACUUM ASSEMBLY-ENABLED FUNDAMENTAL BUILDING MATERIAL

FIELD OF THE INVENTION

The present invention relates to a multi-layer vacuum assembly-enabled fundamental building material and particularly to a fundamental building material to strengthen building structure through a plurality of vacuum layers.

BACKGROUND OF THE INVENTION

With accelerating changes of modern times, constructing a building has evolved from laying individual bricks and tiles in the past to using reinforced concrete at present. These days modern buildings even adopt latest electronic technologies to become the so called intelligent buildings. Constructing a building has to take into account many factors, such as earthquake, landslide or other damages that might incurred to the walls of the building or civil engineering projects. These factors raise severe challenges to the construction technology. Many construction builders have developed various construction materials to increase the bonding strength of the building. There are also some construction builders trying to maximize their profits, even if their final product or effort is not decent. Even they add alkaline foam material in the construction material that have cracked walls or cause crumbling of the structure. It becomes a serious threat of safety problem for every dwellers.

Conventional building materials mostly include bricks, tiles, gypsum and concrete. The bricks and tiles are usually used in the earlier bungalows and single-story houses with annex wings. Such buildings are not strong enough and last longer. Nowadays some countries forbid using bricks in the building. The bricks are burning at a high temperature, and made to much waste gas will generated air pollution. While some conventional techniques have try to use vacuum technology on the fundamental building material, they still can not withstand natural disasters (such as earthquake, corrosion of acid rain, atmosphere warming, etc.). The are damaged easily. As we know, this kind of the fundamental materials can not make buildings last longer.

ROC patent publication No. 282799 entitled "Vacuum heat isolation sheet fabricated by mixing burned wasted ashes and man-made sands and powders" provides a low thermal conducting mixture made from burned waste ashes and man-made silicon powders. The mixture is encased in an air permeable and fine porosity non-woven fabric filter layer. After dried, it is compressed and contained in a plastic pouch that contains an air resistant metal film. Then it is vacuumized to 20 Torricellian or below and sealed. While it can be used for general heat isolation, it is not suitable for use as the fundamental building material. It also has to consider the vacuum range that requires complicated calculations. Fabrication is difficult and production cost is high.

ROC patent publication No. 113707 entitled "Nested vacuum heat isolation brick" provides a brick fabricated by bonding cement, sands and EPS. It has an interior structure between the surface layer and the bottom layer that is designed substantially in a grid like a honeycomb. It functions like a grid beam) used in the construction and has sixteen segments to evenly distribute the pressure on the brick surface. It also has four "bracing struts" running through the EPS heat isolation layer from the surface layer to the bottom layer in the center of the brick. The honeycomb grid beam and bracing struts are formed on the EPS block in a reverse manner. Then the brick mold is filled with concrete) to make the finished product. Although it can evenly share the compression force, it is still prone to be damaged when the external force is concentrated on one spot. Moreover, the honeycomb design is troublesome. The material being selected also can not totally resist strong shock.

Hence it is clear that the conventional building materials still have a lot of problems remained to be overcome.

SUMMARY OF THE INVENTION

Therefore the primary object of the invention is to provide a multi-layer vacuum assembly-enabled fundamental building material that has a plurality of vacuum layers to strengthen the safety of the building structure.

The multi-layer vacuum assembly-enabled fundamental building material according to the present invention mainly includes:

a main body which has a plurality of vacuum layers located from the exterior to the interior and a plurality of spacers to isolate the vacuum layers;

a first latch section located on an outer side of the main body; and a second latch section located on another outer side of the main body.

The main feature of the invention is the vacuum layers being divided by the spacers. Such a structure can cushion the damage resulting from the impact of external forces. The vacuum layers also can block thermal conduction, thus provide fire prevention and heat isolation effects. The latch section may also be coupled with the latch section of another fundamental material to form a building material assembly that can be assembled easily. Therefore adopted the invention on building structure, the vacuum layers can provide a space to cushion the impact of external forces and are shock-resistant.

The foregoing, as well as additional objects, features and advantages of the invention will be more readily apparent from the following detailed description, which proceeds with reference to the accompanying drawings.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

The present invention will become more fully understood from the detailed description given hereinbelow and the accompanying drawings which are given by way of illustration only, and thus are not limitative of the present invention, and wherein.

Embodiment 1

Figure 1:
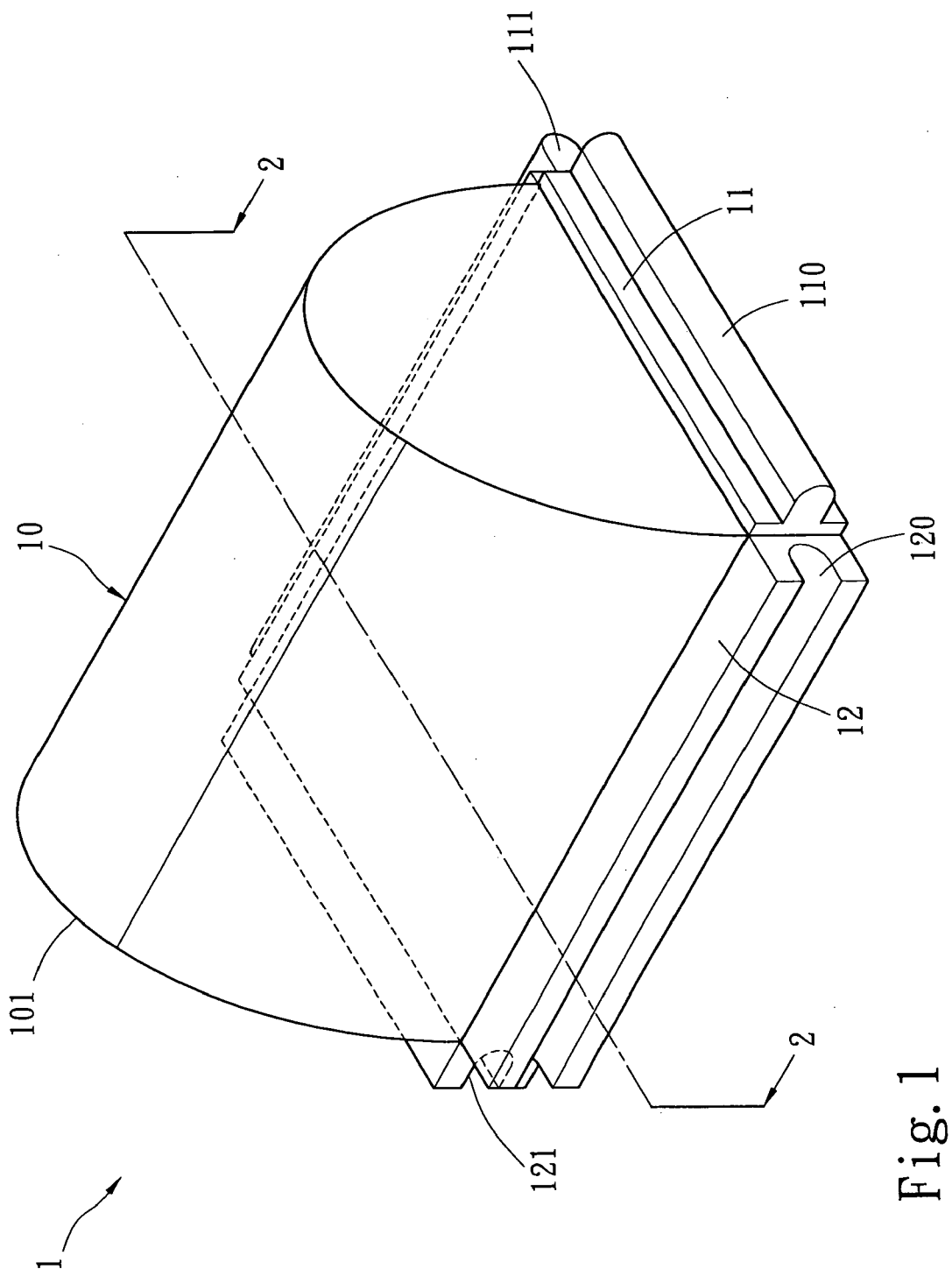
FIG. 1 is a perspective view of a first embodiment of the present invention.
Figure 2:
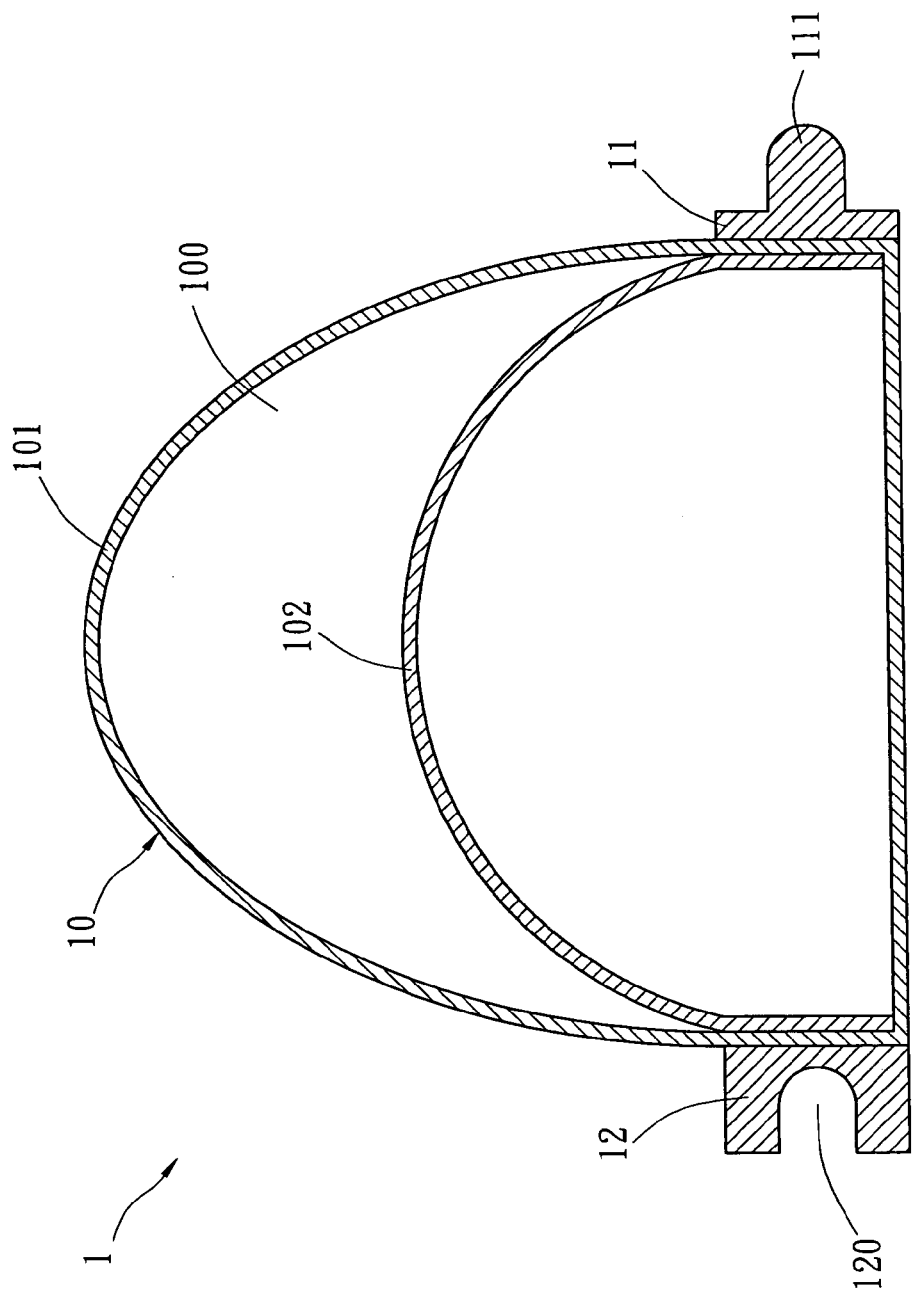
FIG. 2 is a cross section taken on line 2—2 in FIG. 1.
Figure 3:
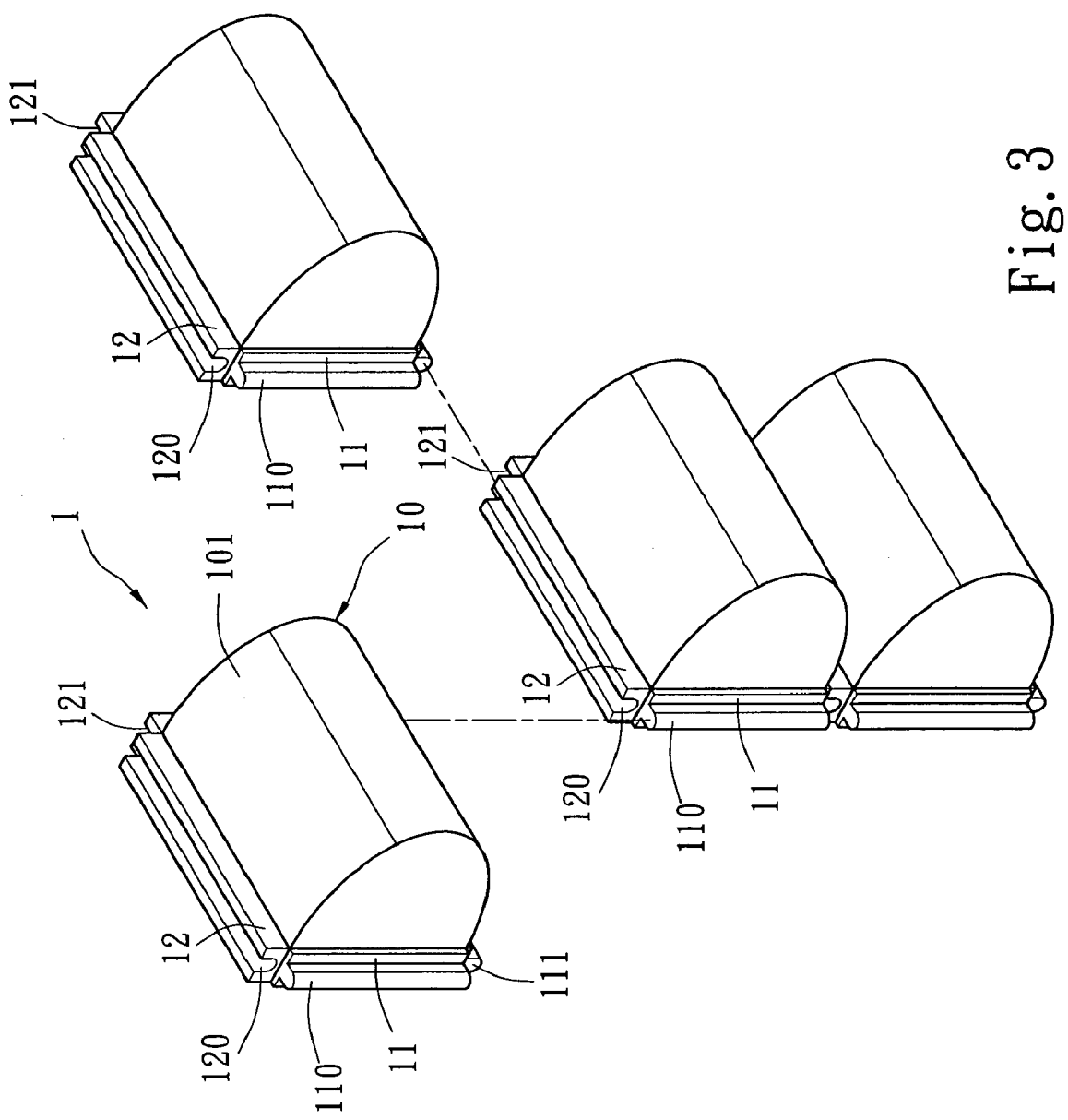
FIG. 3 is a schematic view of the first embodiment of present invention in an assembled condition.

Please refer to FIGS. 1, 2 and 3 for a first embodiment of the invention. The multi-layer vacuum assembly-enabled fundamental building material 1 according to the invention aims at improving the problems occurred to the conventional techniques. It adopts a design of vacuumized multi-layer 100 to strengthen the deficiency of the conventional techniques. The fundamental building material 1 includes:

a main body 10 housed a plurality of vacuumized multi-layers 100 constructed from the exterior towards interior (the main body 10 could be made by metal) that are divided by a plurality of spacers 102. The main body 10 has a cover 101 which may be designed according to requirements of the building structure. The vacuumized multi-layers 100 provide a space to cushion the impact resulting from external forces. The structure of the vacuumized multi-layers 100 also can block thermal conduction and provide heat isolation effect;

a first latch section 11 having curved protrusive sections 110 and 111 on two outer sides of the main body 10; and a second latch section 12 having curved taper grooves sections 120 and 121 formed on another two outer sides of the main body 10. The protrusive section 111 of first latch section 11 may be coupled with the indented groove 120 of second latch section 12 on another fundamental building material 1, while the indented groove 121 of the fundamental building material 1 may be coupled with the protrusive section 110 of another fundamental building material 1 (referring to FIG. 3) to form an assembled fundamental building material. The range of assembly depends on the requirement of building structure, and may consist of a plurality of the fundamental building materials 1. It also could be coupled with cement or other bonding materials to coupling tightness between the first latch section 11 and the second latch section 12.

Referring to FIGS. 2 and 3, when a building adopts the design of vacuumized layers 100 of the invention to assemble the fundamental building material, even if a fire breaks out, the structure of the invention is not easily damaged. As the vacuumized multi-layers 100 of the invention can resist heat conduction, people in the building have an adequate amount of time to escape. In the event of earthquake, the vacuumized layers 100 provide a space to cushion the impact of external forces, and may shake in the direction of the earthquake so that the building is less likely to be damaged. In the winter when the temperature is low, the vacuumized layers 100 can keep indoor warm and conserve warm air without being affected by the outside environment.

Second Embodiment

Figure 4:
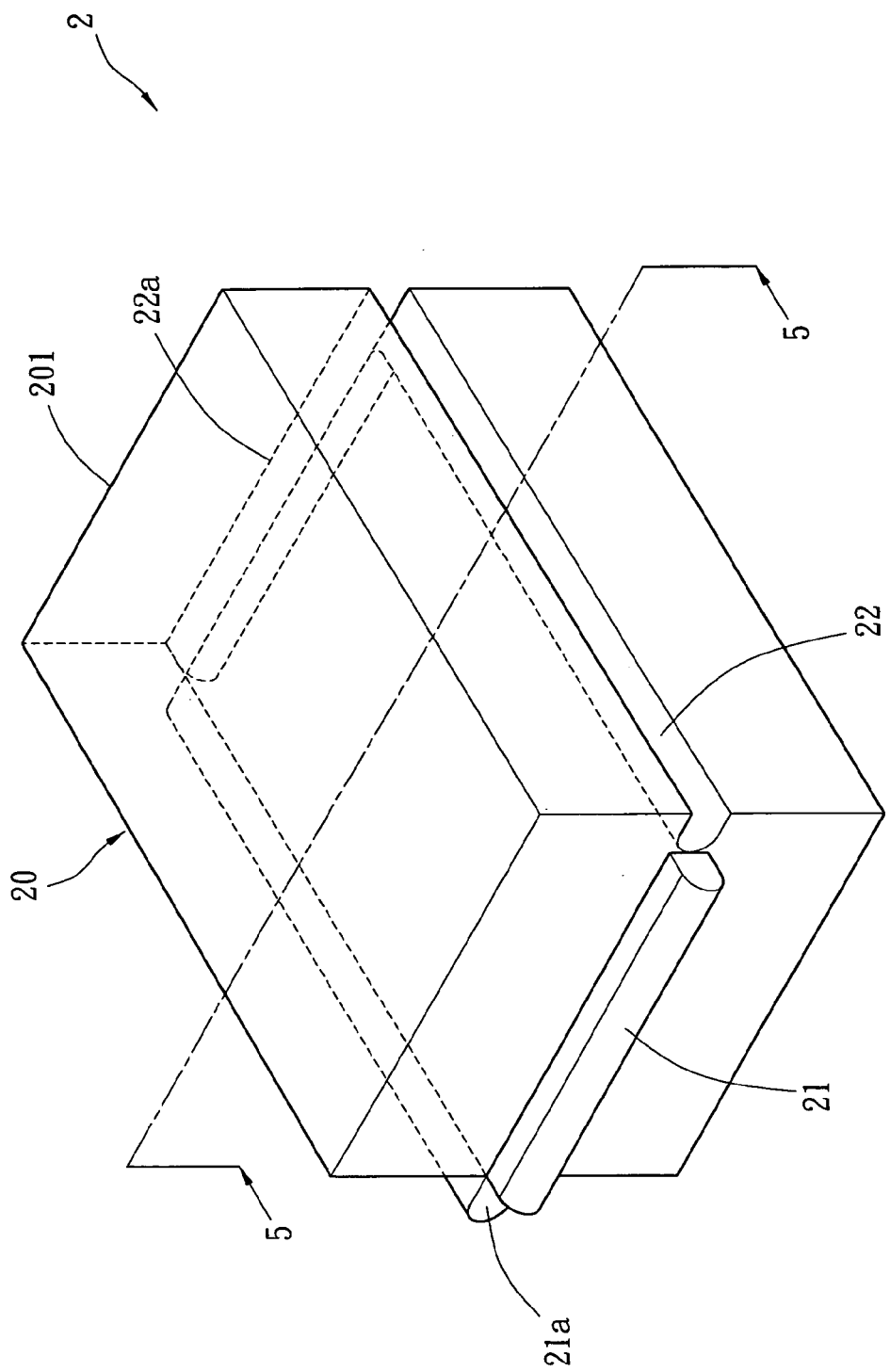
FIG. 4 is a perspective view of another embodiment of the present invention.
Figure 5:
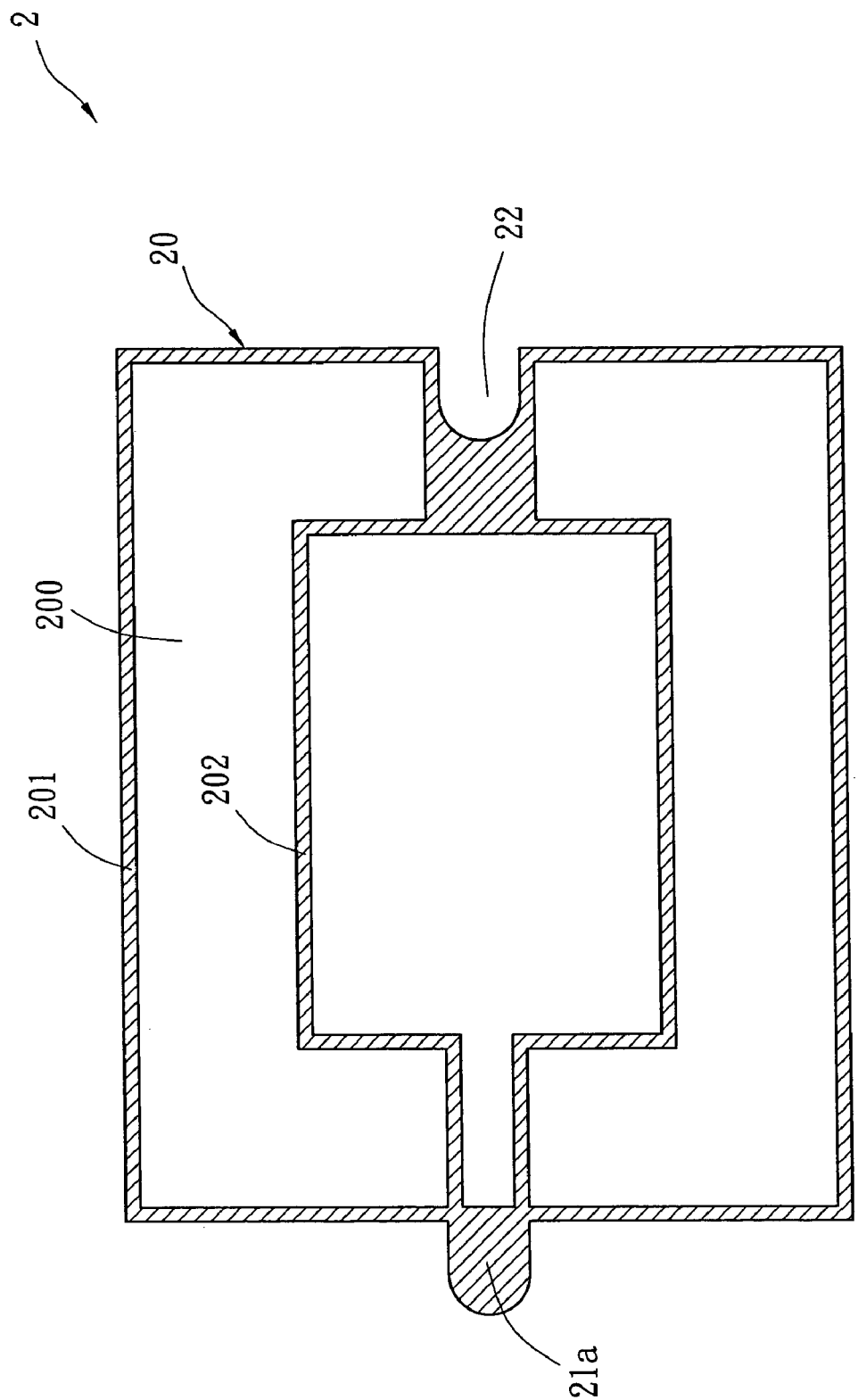
FIG. 5 is a cross section taken on line 5—5 in FIG. 4.
Figure 6:
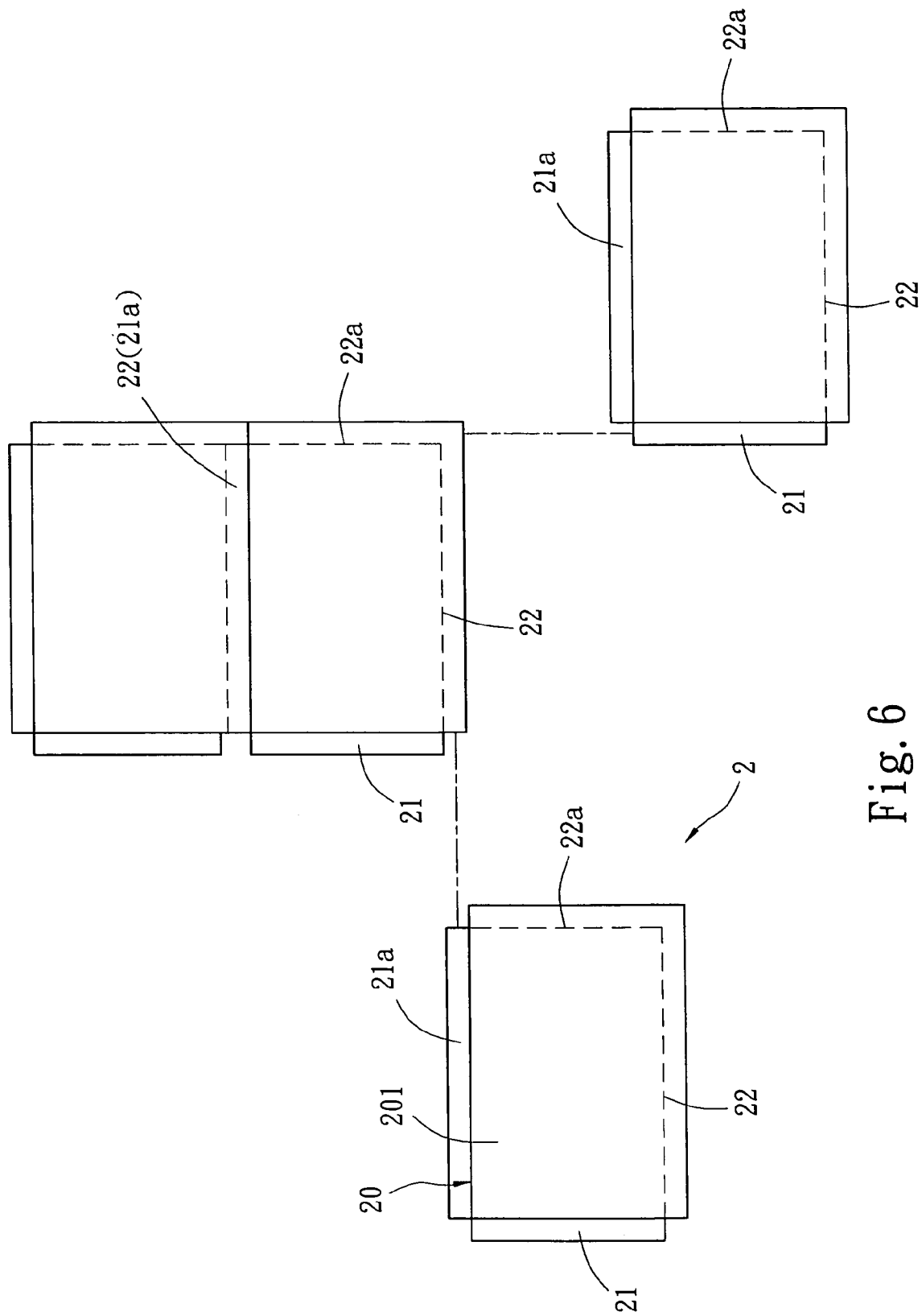
FIG. 6 is a schematic view of another embodiment of present invention in an assembled condition.

Refer to FIGS. 4, 5 and 6 for a second embodiment of the invention. It also adopts vacuumized multi-layers 200 to form a cubical fundamental building material 2. It includes:

a main body 20 housed a plurality of vacuumized multi-layers 200 constructed from the exterior towards the interior that are divided by a plurality of spacers 202. The main body 20 has a cover 201 which may be designed according to requirements of the building structure. The vacuumized multi-layers 200 provide a space to cushion the impact resulting from external forces. The structure of the vacuumized multi-layers 200 also can block thermal conduction and provide shock resistant, fire resistant, heat and cold isolation effects;

first latch sections 21 and 21a with curved protrusive sections on two outer sides of the main body 20; and second latch sections 22 and 22a with curved taper grooves formed on another two outer sides of the main body 20. The second latch section 22a may be coupled with the first latch section 21 of another fundamental building material 2, while the first latch section 21a may be coupled with the second latch section 22 of another fundamental building material 2 (as shown in FIG. 6) to form an assembled fundamental building material. The range of assembly depends on the requirement of the building structure, and may consist of a plurality of the fundamental building materials 2.

What is claimed is:

1. A multi-layer vacuum assembly-enabled fundamental building material for strengthening safety of a building structure, comprising:

a main body housing a plurality of vacuumized multi-layers from said exterior toward said interior thereof, said vacuumized multi-layers being divided by a plurality of spacers, and said main body having a shape designed according to requirements of said building structure;

a first latch section located on an outer side of said main body; and a second latch section located on another outer side of said main body, wherein said second latch section has an indented groove tapered inwards;

wherein said first latch section and said second latch section on one fundamental building material are engageable with said second latch section and said first latch section of another fundamental building material in a serial fashion, to form an assembled fundamental building material.

2. The multi-layer vacuum assembly-enabled fundamental building material according to claim 1, wherein said main body is made of metal.

3. The multi-layer vacuum assembly-enabled fundamental building material according to claim 1, wherein said first latch section has a protrusive section extending outwards.

4. The multi-layer vacuum assembly-enabled fundamental building material according to claim 1, wherein said first latch section and said second latch section are two guide tracks.

5. The multi-layer vacuum assembly-enabled fundamental building material according to claim 1, wherein said fundamental building material is coupled with cement to increase coupling tightness between said first latch section and said second latch section.

6. The multi-layer vacuum assembly-enabled fundamental building material according to claim 1, wherein said fundamental building material is coupled with a bonding material to increase coupling tightness between said first latch section and said second latch section.

* * * * *